L. M. CAMPI.
AUTOMOBILE TIRE.
APPLICATION FILED APR. 16, 1919.
1,326,181.
Patented Dec. 30, 1919.
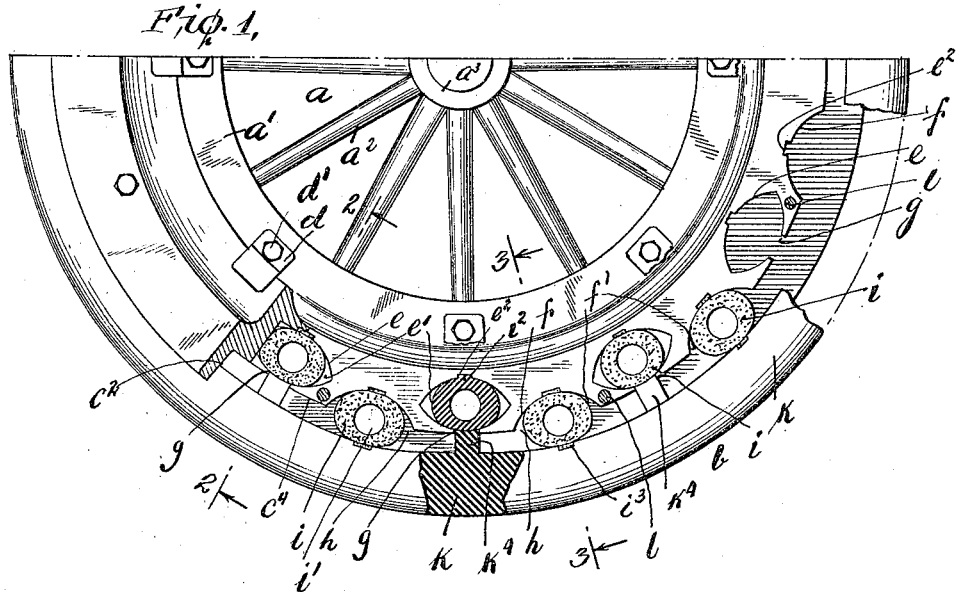
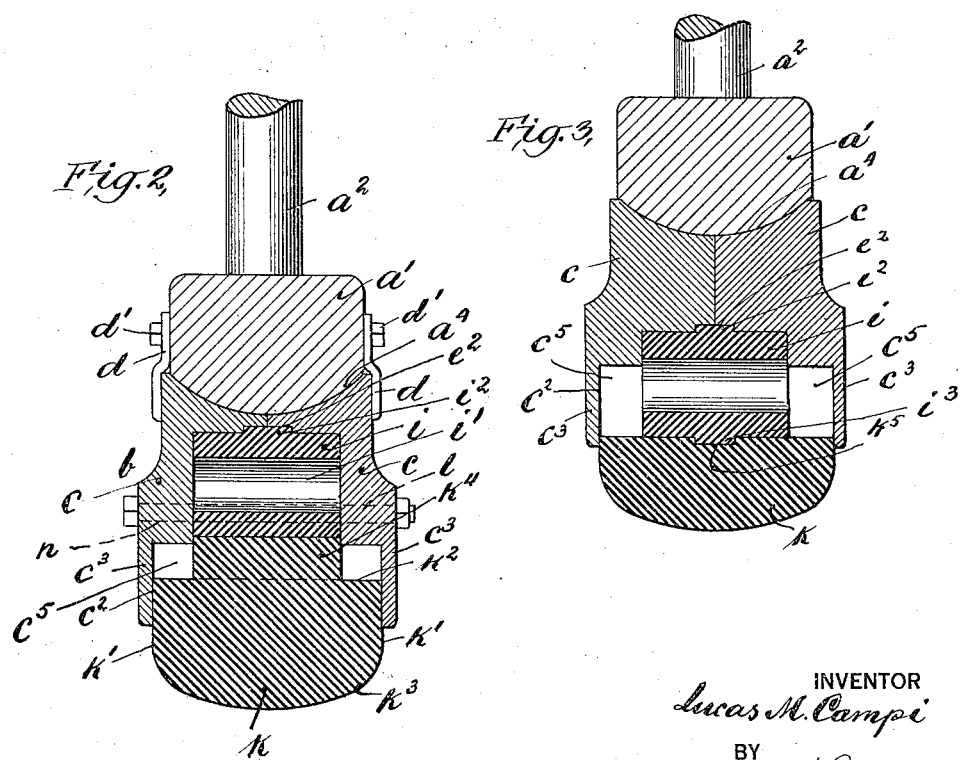
INVENTOR
Lucas M. Campi
BY
ATTORNEY

UNITED STATES PATENT OFFICE.

LUCAS M. CAMPI, OF NEW YORK, N. Y.

AUTOMOBILE-TIRE.

1,326,181.  Specification of Letters Patent.  Patented Dec. 30, 1919.

Application filed April 16, 1919. Serial No. 290,426.

*To all whom it may concern:*

Be it known that I, LUCAS M. CAMPI, a citizen of Cuba, residing at New York, in the county of New York and State of New York, have invented certain new and useful Improvements in Automobile-Tires, of which the following is a specification.

The present invention has reference to rubber tires for vehicles, particularly automobiles and has for its object to produce a tire which will be more durable and less expensive than the hitherto used pneumatic tires.

With this and other objects in view, my invention consists in the construction, arrangement and combination of parts as will be hereinafter more fully described and set forth in the appended claims.

In the accompanying drawing in which similar reference characters denote corresponding parts, Figure 1 is an elevation of a portion of a wheel equipped with my new tire shown partly in section; Fig. 2 is a cross section on line 2—2 of Fig. 1 and Fig. 3 is a cross section on line 3—3 of Fig. 1.

Referring specifically to the drawing $a$ denotes a wheel of which $a'$ is the felly or rim, $a^2$ the spokes and $a^3$ the hub. The rim $a'$ on its outer periphery is convexed as at $a^4$. The tire $b$ is composed of two annular castings or sections $c$, $c'$ of metal adapted to be applied around the rim $a'$ of the wheel and to meet with their inner edges in the vertical central plane of the wheel. The inner circumference $b'$ of each section is concaved to conform with and snugly fit over the outer convexed surface or circumference $a^4$ of the rim $a'$. The two sections when assembled in position of use will be somewhat larger in width than that of the rim, i. e. each section will slightly project beyond the respective lateral edge of the rim as shown in Figs. 2 and 3 and will be clamped in position to the rim by the clamp members $d$ which, by screw bolts $d'$ are fixed to the rim. The inner face of each section is provided with a number of grooves $e$ of substantially elliptical shape (Fig. 1). The grooves $e$ are distributed in a circle all around the inner surface of each section. The grooves in the two sections are arranged opposite one another and are made to correspond with one another exactly in shape, size and location. In addition to the set of elliptical openings or grooves, I provide a second set of grooves $f$ arranged in a circle concentric to the circle of the first named set and of a larger radius. The grooves of the second set are of semi-elliptical cross section and of about the same length as that of the grooves $e$. The grooves $e$ and $f$ in each set are spaced apart a distance substantially equal to their lengths so that the ends of a groove $f$ are in range with the corresponding ends of the grooves $e$ adjacent thereto. Owing to this arrangement of the two sets of grooves relative to one another I am enabled without weakening the sections to make the grooves to follow one another as closely as possible. From a line coinciding with the base or longitudinal axis of the semi-elliptical grooves up to the outer circumference of the castings or sections the inner surface of each section is cut out to provide an annular groove $c^2$, the lateral outer wall $c^3$ of which forms a comparatively thin rim.

The inner circumferential and cylindrical wall $c^4$ of the groove $c^2$ is provided opposite each elliptical groove $e$ with an opening $g$ which in width is equal to and in length smaller than the groove $e$. A second series of openings $h$ are produced in said wall $c^4$ by cutting away the material along the base of the semi-elliptical grooves which openings $h$ are both in width and length equal to those of the grooves $f$. The two series of grooves $e$ and $f$ serve as sockets to hold tubings $i$ of rubber of substantially elliptical cross section having cylindrical central bores $i'$. These tubings for both series of grooves $e$, $f$ are of uniform size and in thickness equal to the largest width or height of the grooves $e$ and in length equal to the depth of the latter. When fitted in a groove $e$ there will be two crescent shaped spaces $e'$ left at the sides of the tubing, one at each end of the groove. These spaces will permit the tubings on compression to expand laterally. The tubings $i$ fitted in the semi-elliptical grooves $f$ will project outwardly from said grooves through the openings $h$. When the tubings $i$ are fitted in said grooves $f$ there will be spaces $f'$ left which will be of semi-crescent shape and which serves the same purpose as the spaces $e'$. The tubings may be secured in the grooves $e$ and $f$ against turning by noses $i^2$ provided on their outer surfaces and adapted to engage notches $e^2$ in the inner surface of the sections $c$.

I furthermore provide a tire $k$ of resilient solid material such as solid rubber having plane side surfaces $k'$ and a cylindrical inner circumference $k^2$ but whose outer circumference $k^3$ is rounded. In width this tire is so admeasured as to snugly fit in the space formed by the two opposite annular grooves $c^2$ when the sections $c$ are assembled. The diameter of this solid tire is such that when placed in position between the adjoining sections $c$ it will not fill the entire space formed by the annular grooves $c^2$ but will project outwardly from within the latter and leave between its inner face $k^2$ and the inner circumferential wall of the grooves $c^2$ an air space $c^5$. The annular rims $c^3$ of the sections $c$ are adapted to sufficiently overlap the sides $k'$ of the tire to hold the latter from falling off, but at the same time to leave room for play to the tire when compressed during operation, that is, not to touch the ground when the tire is compressed to its maximum.

From the inner face of the tire $k$ project a plurality of noses $k^4$ made integral with and of the same material as the tire and arranged one opposite an opening $g$. The noses are adapted to snugly fit in said openings and to extend therethrough so as to be constantly in contact with the tubings $i$ fitted in the sockets $e$. Opposite noses $i^3$ projecting from the tubings $i$ fitted in the semi-elliptical grooves $f$ notches $k^5$ may be provided in the inner circumference $k^2$ of the tire which notches are adapted to snugly engage said noses $i^3$. Instead, of course, similar noses as $k^4$ may be provided on the said inner circumference $k^2$ to rest against the tubings $i$ located in the grooves $f$.

The two metal sections or castings $c$ are adapted, after the parts are completely assembled, to be joined together and tightened by screw bolts $l$ passed through cross openings $n$ provided in the sections and arranged between the grooves $e$, $f$.

In operation the rubber tire $k$ when compressed will press against the rubber tubings $i$. These tubings will in turn be compressed and thereby spread laterally into the free spaces $e'$ and $f'$. Thereby the resiliency of the tire will be considerably enhanced. During the compression and expansion of the tire while in operation, air will be sucked in and expelled through the crevices between the rims $c^3$ of the sections $c$ and the side walls $k'$ of the rubber tire so that the air in the chamber will be always cooled.

The tire constructed according to this invention will have the advantage that it will be less expensive than the hitherto used pneumatic tires which have been found to be objectionable because of their becoming quickly worn out and because of the frequent damage caused by punctures.

The assembling and removal of the different parts of my new tire can be effected in a very convenient and quick manner. In case of damage to any part the latter can be easily and cheaply replaced.

As the construction described and shown is only one embodiment of my invention, I do not wish to restrict myself to the details thereof, since various changes can be easily made by those skilled in the art without departing from the spirit of my invention.

What I claim and desire to secure by Letters Patent is:

1. The combination with the rim of a wheel, of a tire comprising a rigid member divided circumferentially in two sections, each section formed in its inner surface with sockets, tubings of resilient material in said sockets extending through the latter transversely to said wheel and a tire of solid resilient material encircling said rigid member and bearing on said tubings.

2. The combination with the rim of a wheel, of a tire comprising a sectional annular rigid member having sockets in its sections, resilient tubings supported in said sections transversely to said wheel and a resilient tire of solid material encircling said rigid member and bearing on said tubings.

3. The combination with the rim of a wheel, of a tire comprising a sectional rigid member encircling said rim each section being formed with sockets, means for clamping the said member in position, tubings of resilient material supported in said sockets transversely to said wheel, and a solid tire of resilient material loosely borne in said member bearing on said tubings.

4. The combination with the rim of a wheel, of a tire comprising a sectional rigid member encircling said rim, each section being formed with elliptically curved sockets, means for clamping the said member in position, tubings of resilient material supported in said sockets transversely to said wheel, a solid tire of resilient material loosely borne in said member and bearing on said tubings and an air chamber between the inner circumference of said solid tire and said rigid member.

5. In combination with the rim of a wheel, a tire comprising two annular metal sections meeting with their inner edge in the vertical central plane of the wheel, and of which each is provided on its inner face with sockets, tubings of resilient material loosely borne in said sockets transversely to said wheel and capable of expanding laterally in said sockets, a tire of resilient solid material encircling and bearing against said tubings and held in position by said rigid sections and means for tightening said rigid sections together.

6. In combination with the rim of a wheel, a tire comprising a rigid annular body adapted to be connected to said rim and having sockets and an annular groove, resilient tubings loosely fitted in said sockets transversely to said wheel, a resilient tire loosely borne in said annular groove and resting on said tubings and means for securing said tubings in position within said sockets.

7. In combination with the rim of a wheel, a rigid annular body adapted to be clamped to said rim and having sockets and an annular groove, rubber tubings loosely borne in said sockets transversely to said wheel, a solid rubber tire loosely borne in said annular groove and resting against said tubings, said tire being adapted to project outwardly from said rigid member and have a free space between its inner circumference and the said rigid body to form an air chamber.

8. In combination with the rim of a wheel, a rigid annular body composed of two circumferentially divided sections each formed on its inner face with sets of grooves forming sockets and an annular groove, rubber tubings loosely borne in said sockets transversely to said wheel, a rubber solid tire loosely borne in said annular grooves and resting on said tubings, the lateral walls of said annular grooves being adapted to overlap the sides of said tire, means for clamping said body to said rim and means for tightening said sections together.

In testimony whereof I affix my signature in presence of two witnesses.

LUCAS M. CAMPI.

Witnesses:
   FRED J. GRIESMER,
   MAX D. ORDMANN.